United States Patent
Kotowski et al.

(10) Patent No.: US 6,812,426 B1
(45) Date of Patent: Nov. 2, 2004

(54) AUTOMATIC REJECT UNIT SPACER AND DIVERTER

(75) Inventors: Andreas F. Kotowski, Rancho Palos Verdes, CA (US); Douglas Roy Gillard-Hickman, Crowborough (GB)

(73) Assignee: Rapiscan Security Products, Hawthorne, CA (US)

( * ) Notice: Subject to any disclaimer, the term of this patent is extended or adjusted under 35 U.S.C. 154(b) by 0 days.

(21) Appl. No.: 09/904,206

(22) Filed: Jul. 11, 2001

Related U.S. Application Data

(60) Provisional application No. 60/220,454, filed on Jul. 24, 2000.

(51) Int. Cl.[7] .......................... B07C 5/34; B65G 47/52; B65G 43/10
(52) U.S. Cl. ................. 209/589; 209/942; 198/460.1; 198/502.2
(58) Field of Search ................ 209/589, 942, 209/938, 546, 702; 198/460.1, 502.2

(56) References Cited

U.S. PATENT DOCUMENTS

| | | | | |
|---|---|---|---|---|
| 3,458,026 A | * | 7/1969 | Lauzon et al. | 198/460.1 |
| 3,485,339 A | * | 12/1969 | Miller et al. | 198/460.1 |
| 3,955,678 A | * | 5/1976 | Moyer | 198/370.07 |
| 3,980,889 A | * | 9/1976 | Haas et al. | 250/519.1 |
| 4,991,708 A | * | 2/1991 | Francioni | 198/419.2 |
| 5,092,451 A | * | 3/1992 | Jones et al. | 198/460.1 |
| 5,097,939 A | * | 3/1992 | Shanklin et al. | 198/419.2 |
| 5,341,916 A | * | 8/1994 | Doane et al. | 198/460.1 |
| 5,505,291 A | * | 4/1996 | Huang et al. | 198/460.3 |
| 5,600,303 A | * | 2/1997 | Husseiny et al. | 340/568.1 |
| 5,600,700 A | * | 2/1997 | Krug et al. | 376/159 |
| 5,634,551 A | * | 6/1997 | Francioni et al. | 198/460.1 |
| 5,642,393 A | * | 6/1997 | Krug et al. | 376/159 |
| 5,738,202 A | * | 4/1998 | Ydoate et al. | 198/460.1 |
| 5,870,449 A | * | 2/1999 | Lee et al. | 378/57 |
| 6,073,751 A | * | 6/2000 | Worzischek | 198/460.1 |
| 6,431,344 B1 | * | 8/2002 | Emmermann et al. | 198/448 |
| 6,446,782 B1 | * | 9/2002 | Patrick | 198/370.06 |
| 6,629,593 B2 | * | 10/2003 | Zeitler | 198/460.1 |
| 2002/0038753 A1 | * | 4/2002 | Ursu | 198/460.1 |

FOREIGN PATENT DOCUMENTS

| | | | | |
|---|---|---|---|---|
| DE | 3214910 | * | 5/1983 | B65G/43/08 |
| EP | 963925 | * | 12/1999 | 209/589 |
| GB | 2337032 | * | 10/1999 | 209/589 |
| JP | 411230918 | * | 8/1999 | 209/589 |
| JP | 2001-233440 | * | 8/2001 | 209/589 |

* cited by examiner

*Primary Examiner*—Donald P. Walsh
*Assistant Examiner*—Daniel K Schlak
(74) *Attorney, Agent, or Firm*—Patent Metrix

(57) ABSTRACT

A method and apparatus for automatic spacing and diverting of packages on a conveyor system ensures an adequate gap between packages deposited onto a loading conveyor for subsequent inspection. A speed ratio between the loading conveyor and an inspection conveyor, a package detector disposed between the loading conveyor and the inspection conveyor, an interruption device controlling the loading conveyor and a controller to permit a signal from the package detector to command the interrupting device to temporarily halt the loading conveyor are used to ensure proper spacing between packages passed to a scanner. The apparatus may also include a package diverter for diverting a package to another area for further inspection.

10 Claims, 2 Drawing Sheets

AUTOMATIC REJECT UNIT SPACER AND DIVERTER

RELATED U.S. APPLICATION DATA

This application claims the benefit of U.S. Provisional Patent Application Ser. No. 60/220,454 filed on Jul. 24, 2000.

FIELD OF THE INVENTION

The present invention relates to an automatic spacing and diverter device for use with a conveyor system.

BACKGROUND OF THE INVENTION

Security at high traffic installations such as airport terminals typically requires inspection of packages being loaded onto the transport. Travelers generally prefer to avoid lengthy delays imposed by such inspections. Hence, in order to expedite inspection within the shortest period of time and with a minimum of privacy infringement, security systems have been established to screen the packages, by radiating x-rays through the packages to a detector to produce an image. This image can be viewed by a security agent on an image display device, and if found innocuous, will result in the package being passed on for delivery to the traveler or the transport. If the image suggests further inspection is required, the package can be isolated from others and searched in more detail.

An inspection system may comprise a series of conveyors to bring a package to the x-ray imager in order to screen the package. After screening, in some systems the package continues on the conveyors and is sent to either a clearance conveyor or diverted to a search conveyor. Such inspection systems typically require a minimum spacing or gap between packages for proper inspection. Such a requirement may be exacerbated by conventional systems in which there is no loading conveyor or in which the inspection conveyor is slower than the loading conveyor to enable more inspection time for a slow inspection process, but with the drawback of either reducing or eliminating the loaded gap between packages. A gap much greater than the required minimum tends to retard the system operation and thus results in unnecessary delays. Packages brought by travelers come in a wide assortment of sizes and shapes, such as trunks, attache cases, boxes, backpacks, etc. In addition, travelers personally loading their packages onto a conveyor may not provide sufficient gap between packages, and may have packages overlap one another, inhibiting the x-ray screening process. Authorized loading personnel may be used to properly load a conveyor instead of permitting travelers to do so, but at a greater operational cost when compared to a more automated system.

BRIEF DESCRIPTION OF THE INVENTION

A method and apparatus for automatic spacing and diverting of packages on a conveyor system ensures an adequate gap between packages deposited onto a loading conveyor for subsequent inspection. A speed ratio between the loading conveyor and an inspection conveyor, a package detector disposed between the loading conveyor and the inspection conveyor, an interruption device controlling the loading conveyor and a controller to permit a signal from the package detector to command the interrupting device to temporarily halt the loading conveyor are used to ensure proper spacing between packages passed to a scanner. The apparatus may also include a package diverter for diverting a package to another area for further inspection.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of an Automatic Reject Unit Spacer and Diverter. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks, wide area networks, metropolitan area networks, the Internet, cable television systems supporting bi-directional data communication, telephone systems, wireless data telecommunications systems, fiber optic networks, ATM (asynchronous transfer mode) networks, frame relay networks, satellite data telecommunications networks, and the like. Such networks are well known in the art and consequently are not further described herein.

Figure 1:
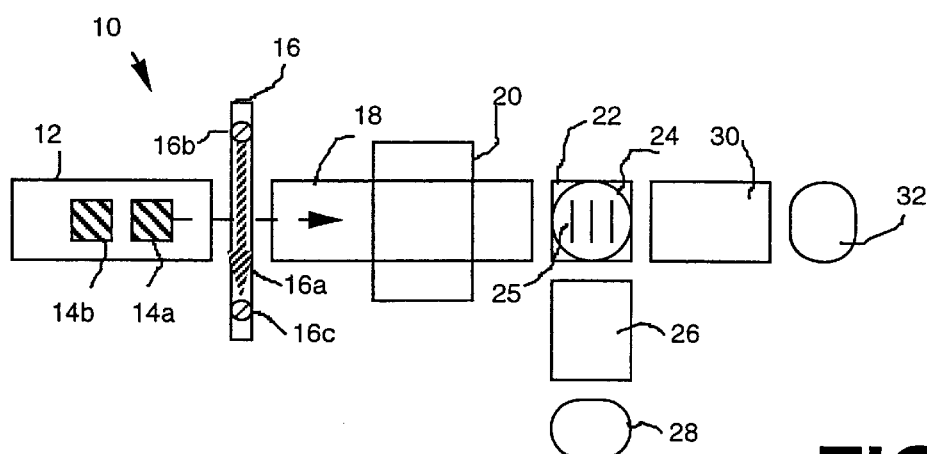
FIG. 1 is a top-view of a package inspection system with conveyors and detector in accordance with an embodiment of the present invention.

The present invention is directed to a method and apparatus for controlling a multiple-conveyor system to provide an appropriate gap between non-uniform packages in order to facilitate inspection in systems such as x-ray inspection systems. FIG. 1 illustrates an example of such a conveyor system in top view according to the present invention. The package conveyor system 10 begins with a loading conveyor 12 on which downstream package 14a and upstream package 14b are placed for transport from left to right. At the end of the loading conveyor 12, downstream package 14a will encounter a detector 16 such as a photo-electric cell (PEC) in which a light beam 16a across the conveyor path is interrupted when package 14a passes by. The light beam is produced by an emitter 16b and intercepted by a receiver 16c. When the downstream package 14a has reached the end of the loading conveyor 12, its presence blocks the light beam 16a from being received by said receiver 16c. This interruption of light beam 16a may be detected as a loss of light beam signal at the receiver 16c until the downstream package 14a has passed the detector 16 and no longer blocks the light beam 16a. The period of interruption determines the "length" of the downstream package 14a. The package length, in turn, may determine the necessary gap for proper inspection. A minimum gap distance may be required, but beyond a certain length, the longer the package, the greater the gap required between packages 14a and 14b.

After passing the detector 16, the package 14a is transferred to the inspection conveyor 18 where it is scanned in an x-ray chamber 20 by an authorized inspector. In contrast to previous conveyor systems, the detector 16 is interposed between the loading conveyor 12 and the inspection conveyor 18, rather than along the path of the inspection conveyor 18 or the equivalent thereof. The package 14a proceeds to an automatic-reject-unit (ARU) 22 that includes a turntable 24 with conveyance rollers 25. If the inspector decides that the package 14a warrants further inspection, the ARU 22 may preferably be directed to send the package 14a towards the search conveyor 26 where it would be deposited at an inspection location 28 awaited by an authorized searcher to examine the contents of package 14a in more detail. Otherwise, the package 14a would normally be directed towards the clearance conveyor 30 and sent to the receiving station 32 for retrieval by the traveler or submission to the awaiting transport. The same holds for upstream package 14b.

In the example illustrated in FIG. 1, the default disposition of the turntable 24 on ARU 22 may be set to transfer packages 14a and 14b to clearance conveyor 30 proceeding from left to right. If an inspector decides that downstream package 14a requires further inspection, the turntable 24 may be rotated clockwise 90° (or counterclockwise 270°) to send package 14a to the search conveyor 26. The turntable 24 might remain in that position as a new default until the inspector commands upstream package 14b to be sent to the clearance conveyor 30. Alternatively, the turntable 24 may be returned to its original position and rotated counterclockwise 90° (or clockwise 270°) so that package 14b may proceed to the clearance conveyor 30 without further action by the inspector, unless inspection of package 14b is also deemed warranted, in which case it may be directed to search conveyor 26.

In the present invention, the detector 16 is disposed between the loading conveyor 12 and the inspection conveyor 18. The detector 16 may have a light emitter and a light receiver on either side of the conveyor path. When a package 14a or 14b passes by the detector 16, the light beam emitted by the emitter will be blocked by the package, interrupting the light beam by the receiver. For a gap to be created between two packages 14a and 14b where no gap exists when loaded on the loading conveyor, the inspection conveyor is set to a speed higher than that of the loading conveyor. In the preferred embodiment of the present invention, the inspection conveyor operates at a nominal speed of 0.2 to 0.3 meters per second. Such a speed provides for an inspection time period of between three and five seconds per approximately suitcase-sized package 14a or 14b. In accordance with a presently preferred embodiment of the present invention, the inspection conveyor 18 operates at a nominal speed of no less than 1.1 times (or 10% greater than) the speed of the loading conveyor 12, and no more than 2.0 or 3.0 times (or 100% or 200% greater than) the speed of the loading conveyor 12.

A downstream package 14a exiting the loading conveyor 12 and entering the inspection conveyor 18 initially continues at the loading conveyor speed. When over half the weight of the package 14a has been transferred from the loading conveyor 12 to the inspection conveyor 18, the friction forces between the package 14a and the inspection conveyor 18 exceed those between the parcel 14a and the loading conveyor 12, and the package 14a. As a consequence, the package 14a accelerates from the loading conveyor speed to the faster inspection conveyor speed, while the upstream package 14b remains behind moving at the loading conveyor speed. Because the downstream package 14a is traveling at a faster conveyor speed than the upstream package 14b until the latter also accelerates to the inspection speed, a gap between packages 14a and 14b is either created or increased in length.

The loading conveyor 12 may also be halted in the event that the gap produced by the speed differential between the loading conveyor 12 and the inspection conveyor 18 is inadequate to provide sufficient inspection time. Such a condition may occur when the length of package 14a is so short that the gap produced is deemed insufficient. For example, a purse 0.20 m in length may only generate a 0.02 m nominal space where inspection speed is only 10% higher than the loading speed. By halting or interrupting the loading conveyor for a brief period of time, the downstream package 14a has more time to travel along the inspection conveyor 18 before upstream package 14b resumes its travel on the loading conveyor 12.

Figure 2:
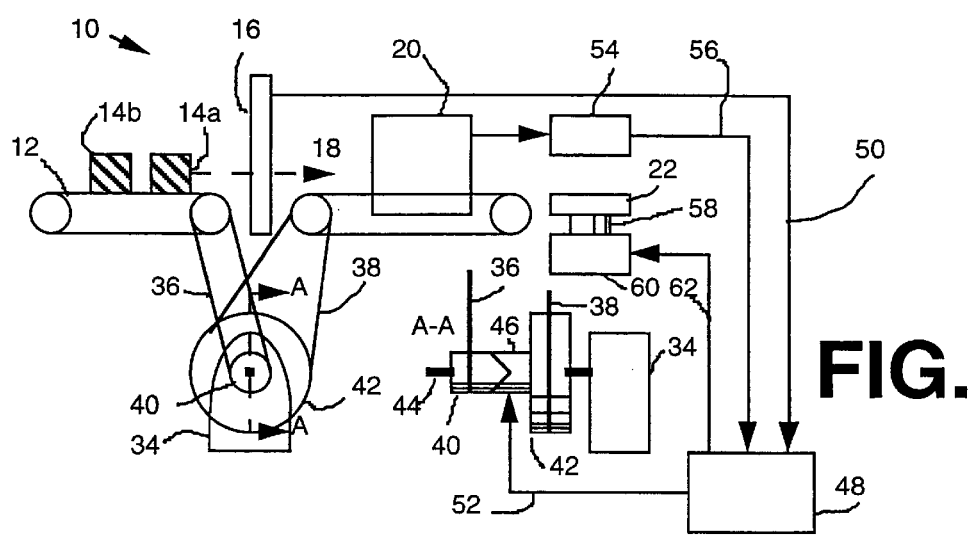
FIG. 2 is a side-view of a package inspection system with conveyors and detector in accordance with an embodiment of the present invention.

The side view diagram FIG. 2 illustrates a portion of the conveyor illustrates the gap-producing mechanisms in more detail. The conveyor system 10 features a loading conveyor 12 on which downstream package 14a and upstream package 14b are placed moving left to right. At the end of loading conveyor 12, the packages 14a and 14b pass by the detector 16 onto inspection conveyor 18 to be scanned in an x-ray chamber 20. The loading conveyor 12 is powered by a pulley motor 34, and these may be connected together by means of a loading pulley 36. The inspection conveyor 18 is also powered by the pulley motor 34, and these may be connected together by means of an inspection pulley 38. To govern the speeds, the loading pulley may be connected to the pulley motor 34 through a loading wheel 40 which may turn at the rotation speed of the pulley motor 34, while the inspection pulley may be connected to the pulley motor 34 through an inspection wheel 42. If the loading wheel 40 is smaller in diameter than the inspection wheel 42, the loading pulley 36 will move at a slower speed than the inspection pulley 38 for the same rotational speed of the pulley motor 34. In view A—A, the pulley motor 34 rotates a shaft 44 that turns loading wheel 40 and inspection wheel 42 which is connected to the shaft 44 of the pulley motor 34 by means of a clutch 46. The loading wheel 36 may be halted (thus interrupting the loading conveyor 12) by disengaging the clutch 46 from the loading wheel 40, while permitting the pulley motor 34 to continue operating to turn inspection wheel 42 for moving inspection pulley 38 to move inspection conveyor 18. Other mechanisms to briefly interrupt the movement of the loading conveyor 12 while permitting the inspection conveyor 18 to move can be easily envisioned by those skilled in the art. Other mechanisms to move the loading conveyor 12 at a speed different from the inspection conveyor 18 can also be readily recognized by those skilled in the art. For example, direct drive motors could be used.

The engagement of the clutch 46 with which to move loading conveyor 12 may be commanded by a controller 48. The detector 16 sends a signal indicating to the controller 48 indicating whether the emitted light beam to the receiver has been interrupted by a package. Based on these signals from the detector 16, the controller 48 determines that the period of time by which downstream package 14a passed by was too brief to ensure an adequate gap between downstream package 14a and upstream package 14b for inspection in the x-ray chamber 20. Under such conditions, the detector 16 may send a signal 50 to the controller 48 to halt loading conveyor 12 by disengaging the clutch 46 from the loading wheel 40. When the detector 16 determines that the gap between the downstream package 14a and upstream package 14b is sufficient for further inspection, it may send a signal 50 to the controller 48 to resume operation of loading conveyor 12 by reengaging the clutch 46 to the loading wheel 40.

The x-ray chamber 20 may send a signal or an image of the downstream package 14a to a display device 54. From the inspection display device 54, an inspector may send a signal 56 to the controller 48 to divert the downstream package 14a to the search conveyor 26 rather than clearance conveyor 30. The ARU 22 pivots the turntable 24 on a turntable shaft 58 connected to a turntable motor 60. The controller 48 sends a signal 62 which commands the turntable motor 6 to rotate the turntable shaft 58 and thus divert the downstream package 14a at the ARU 22 for further inspection at searching station 28 by authorized personnel. In an alternate embodiment, an inspector at the inspection display device 54 may instruct the controller 48 by signal 56 to disengage the clutch 46 so as to halt the loading conveyor 12 so as to provide additional time for searching packages.

As an example, assume a minimum specified gap of 1 m, an inspection conveyor speed of 0.25 m/s and an inspection-to-loading speed ratio of 2.0. Two tandem packages with no gap between them on the loading conveyor would become separated as the first package transfers to the inspection conveyor. If the first package has a length of 0.2 m, it will require 0.8 sec to pass by the detector between the loading conveyor and the inspection conveyor. Assuming the second package has virtually no length, the gap produced between the packages across the detector would correspond to $x_{12} = u_1 \lfloor 1-(u_{i/u_1})^{-1} \rfloor \cdot \Delta t_{ld}/2 = 0.05$ m, where x is the gap distance, u is the conveyor speed and $\Delta t$ is the time across the detector. The subscripts are 1 for the first package, 2 for the second package, i for inspection conveyor, l for loading conveyor and d for detector. The gap between the first and second packages traveling would traverse a stationary point along the inspection conveyor within gap time $\Delta t_g = x_{12}/u_i = 0.2$ sec. To pass through the x-ray chamber for about three seconds exposure ($\Delta t_{req}$), a sufficient gap between the first and second packages is required. In this case, the x-ray chamber would require such a gap distance of $x_{req} = u_i \Delta t_{req} 0.75$ m, or an increase from the gap produced by the speed differential of $x_{dif} = x_{req} - x_{12} = 0.70$ m. In order to provide this difference gap, the loading conveyor must be interrupted for a period corresponding to $\Delta t_{halt} = x_{dif}/u_l = 5.6$ sec.

Figure 3:
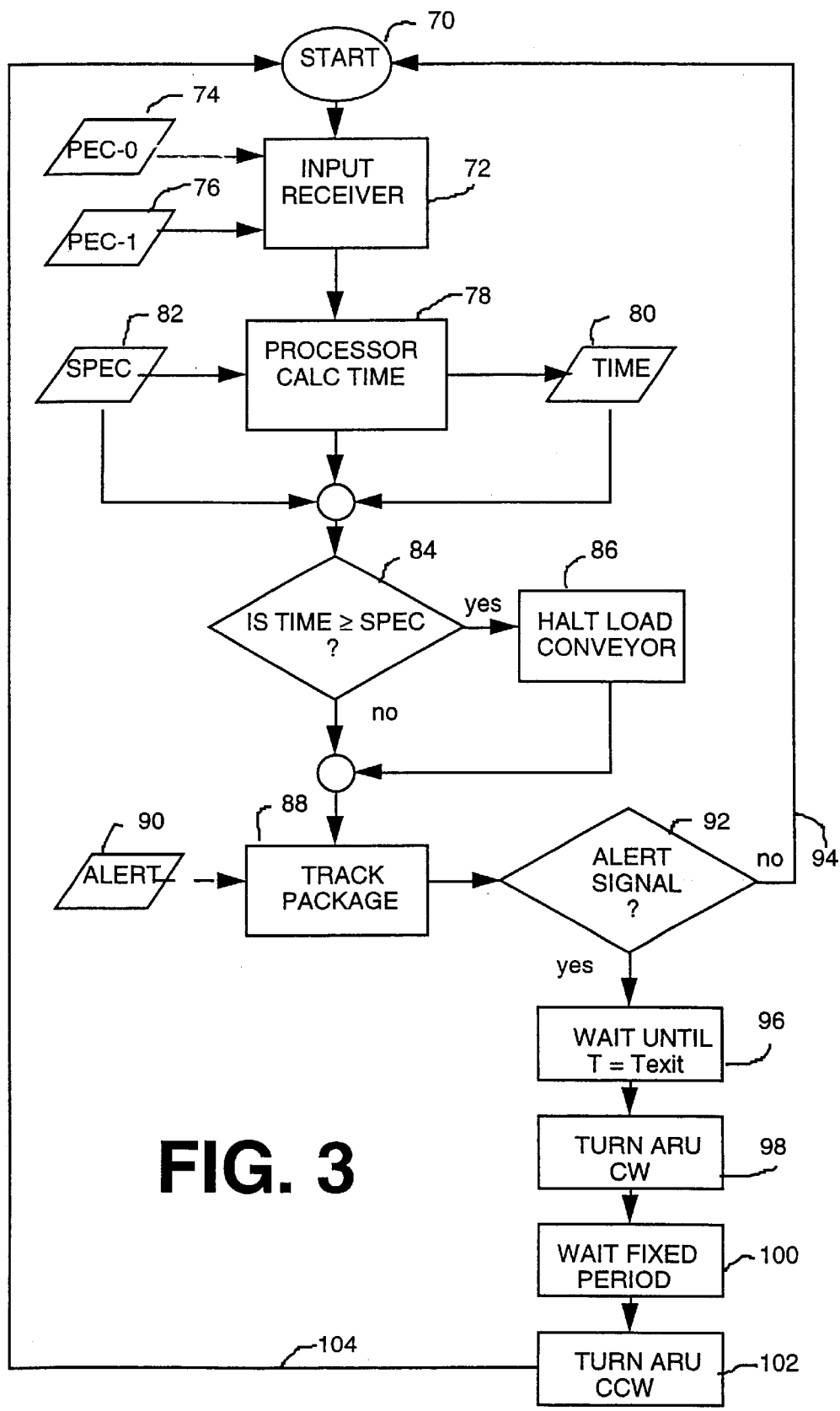
FIG. 3 is a flow-chart of a package inspection system with conveyors and detector in accordance with an embodiment of the present invention.

The logic control for controller 48 utilizes a process as described in the flow diagram of FIG. 3. The process begins at the start position 70. The controller's input receiver 72 receives a first signal 74 from the PEC detector indicating that a package has crossed its path. In the diagram, this is illustrated as a "0" indicating that the package has interrupted the photoelectric transmission. Subsequently, the input receiver 72 receives a second signal 76 from the PEC detector indicating that the package is no longer crossing its path. This is illustrated as a "1" indicating that the photoelectric transmission has resumed since the package is no longer present at the detector location. The controller processor 78 calculates the passing time 80 between the first signal 74 and the second signal 76 to determine if that passing time 80 satisfies a specified minimum provided from data storage 82. Such a minimum time 82 would correspond to an adequate gap distance between the package and another package following. If the passing time 80 is less than the required minimum time 82 I the comparison operator 84, a halt command 86 is sent to disengage the loading conveyor for the time period required and the system proceeds to the next instruction 88. If the passing time 80 is adequate, the logic path bypasses the halt command 86 to the part of the process 88 where the package is tracked by registering the time between entry onto the inspection conveyor and calculating the time to the ARU by adding to the entry time the length of the inspection conveyor $x_i$ divided by the inspection conveyor speed $u_i$, as $t_{exit} = t_{enter} + x_i/u_i$. The controller may receive an alert signal 90 from the inspector at the x-ray chamber to divert the package when it reaches the ARU so as to enter the search conveyor rather than proceed to the clearance conveyor. The path to the alert signal 90 is shown in a dashed line, to indicate that this is an inspector-supplied input. A logic operator 92 determines whether such an alert signal 90 is received. If not, the controller initiates a return 94 to start 70 for additional input. If an alert signal 90 has been received, the controller determines a wait period 96 until package has reached the ARU, and then sends a rotate-clockwise command 98 to the ARU turntable. Once the package has been transferred to the search conveyor by waiting a sufficient period 100, the controller may send a rotate counterclockwise command 102 to the ARU turntable for subsequent packages that by default will proceed to the clearance conveyor. Following this, the controller initiates a return 104 to start 70 for further input.

By having the loading conveyor set to a slower speed compared to the inspection conveyor and coupled with a detector device which can signal the loading conveyor to be interrupted, adequate gaps between parcels providing sufficient time for screening inspection at security locations can be ensured. The present invention accomplishes this objective resulting in a reduction of personnel required in order to accomplish the task of providing adequate gaps.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A system for controlling a plurality of package conveyors, said system comprising:

a loading conveyor nominally operating at a first speed disposed along a conveyor path to transport a first package and a second package, wherein said first package at least initially leads said second package along said conveyor path;

a conveyor interrupter for controllably halting said loading conveyor;

an inspection conveyor operating at a second speed disposed along said conveyor path downstream of said loading conveyor to receive and transport said first and second packages, said second speed being greater than said first speed to produce a first gap between said first package and said second package;

a package detector for sequentially detecting said first and second packages, said package detector comprising a photo-electric cell having an emitter to emit a light beam and a receiver to receive said light beam, said light beam disposed across said conveyor path between said loading conveyor and said inspection conveyor;

a first controller responsive to said package detector, said first controller signaling said conveyor interrupter to halt said loading conveyor for producing a second gap between said first package and said second package, said second gap being based at least in part on measuring a length of time of a period of interruption of said light beam by said first package, said first gap and said second gap together satisfying a minimum specified gap between said first package and said second package when traveling on said inspection conveyor;

a first signal link between said package detector and said first controller;

a second signal link between said conveyor interrupter and said first controller;

an x-ray chamber to scan said first package to produce a scanned image, said x-ray chamber disposed along said conveyor path;

a viewer to display said scanned image for enabling an inspector to view said scanned image;

a third signal link commanded by said inspector for sending a divert signal for diverting said first package from a clearance destination along said conveyor path to a search destination along a search conveyor path;

a conveyor change platform for sending said first package to one of either said conveyor path or said search conveyor path, said conveyor change platform having a platform switch for receiving said divert signal; and a second controller responsive to said third signal link, said second controller signaling said platform switch to send said first package to said search conveyor path if said divert signal is present and to said conveyor path if said divert signal is absent.

2. A system in accordance with claim 1, wherein said first controller and said second controller are replaced by a single controller.

3. A system in accordance with claim 1, further comprising a fourth signal link from said divert signal to said first controller for controllably halting said loading conveyor.

4. A system in accordance with claim 3 wherein said first controller and said second controller are replaced by a single controller.

5. A system in accordance with claim 1 wherein said receiver has sufficient sensitivity to distinguish between an uninterrupted light beam and an interrupted light beam.

6. A system in accordance with claim 5 wherein when either of said first and second packages is disposed between said loading conveyor and said inspection conveyor said first or second package interrupts said light beam from said emitter to said receiver so that said receiver receives said interrupted light beam, and absence of said first or second package disposed between said loading conveyor and said inspection conveyor permits said receiver to receive an uninterrupted light beam.

7. A method to control a plurality of package conveyors, said method comprising:

depositing a first package on a loading conveyor nominally operating at a first speed and disposed along a conveyor path to transport said first package to an inspection conveyor disposed along said conveyor path;

conveying said first package to said inspection conveyor operating at a second speed greater than said first speed;

detecting said first package by a package detector, said package detector comprising a photo-electric cell having an emitter to emit a light beam and a receiver to receive said light beam, said light beam disposed across said conveyor path between said loading conveyor and said inspection conveyor;

sending a detection signal from said package detector to a first controller, said detection signal being based at least in part on measuring a length of time of a period of interruption of said light beam by said first package;

calculating an interrupt period for controllably halting said loading conveyor in response to said detection signal, said interrupt period producing an actual gap between said first package and a second package that is subsequent to said first package, said actual gap being at least as long as a specified minimum gap;

forwarding said interrupt period to said first controller;

interrupting said loading conveyor by an interrupt command from said first controller in response to said interrupt period;

depositing said first package on said inspection conveyor nominally disposed along said conveyor path to form an inspection path;

transporting said first package to a conveyor change platform disposed along said conveyor path, said conveyor change platform sending said first package to one of either said conveyor path or a search conveyor path;

scanning said first package in an x-ray chamber, said x-ray chamber disposed along said inspection path;

producing a scanned image for enabling an inspector to view said scanned image;

sending a divert signal by said inspector to a second controller; and commanding by said second controller for said conveyor change platform to send said first package to said search conveyor path if said divert signal is present and to said conveyor path if said divert signal is absent.

8. A method in accordance with claim 7 wherein said first controller and said second controller are replaced by a single controller.

9. A system in accordance with claim 7 further comprising commanding by said second controller for interrupting said loading conveyor.

10. An apparatus to control a plurality of package conveyors including a loading conveyor nominally operating at a first speed and disposed along a conveyor path and an inspection conveyor operating at a second speed greater than said first speed and disposed along said conveyor path, said loading conveyor to transport a first package and a second package that is subsequent to said first package to said inspection conveyor, said apparatus comprising:

means for detecting said first package by a package detector, said package detector comprising a photoelectric cell having an emitter to emit a light beam and a receiver to receive said light beam, said light beam disposed across said conveyor path between said loading conveyor and said inspection conveyor;

means for sending a detection signal from said package detector to a first controller, said detection signal being based at least in part on measuring a length of time of a period of interruption of said light beam by said first package;

means for calculating an interrupt period for controllably halting said loading conveyor in response to said detection signal, said interrupt period producing an actual gap between said first package and said second package, said actual gap being at least as long as a specified minimum gap;

means for forwarding said interrupt period to said first controller;

means for interrupting said loading conveyor by an interrupt command from said first controller in response to said interrupt period;

means for scanning said first package in an x-ray chamber, said x-ray chamber disposed along said conveyor path;

means for producing a scanned image for enabling an inspector to view said scanned image;

means for sending a divert signal by said inspector to a second controller;

means for diverting by a conveyor change platform said first package to one of either said conveyor path or a search conveyor path, said conveyor change platform disposed along said conveyor path; and means for commanding by said second controller for said conveyor change platform to send said first package to said search conveyor path if said divert signal is present and to said conveyor path if said divert signal is absent.

* * * * *